United States Patent
Yoon et al.

(10) Patent No.: US 8,952,872 B2
(45) Date of Patent: Feb. 10, 2015

(54) STEREOSCOPIC IMAGE DISPLAY INCLUDING 3D FILTER WITH IMPROVED VOLTAGE DRIVING

(71) Applicant: LG Display Co., Ltd., Seoul (KR)

(72) Inventors: Jaeho Yoon, Jung-ri (KR); Monsoo Kang, Daegu (KR); Jaekwang Lee, Daegu (KP); Deokho Kim, Saha-gu (KR)

(73) Assignee: LG Display Co., Ltd., Seoul (KR)

( * ) Notice: Subject to any disclaimer, the term of this patent is extended or adjusted under 35 U.S.C. 154(b) by 95 days.

(21) Appl. No.: 13/679,655

(22) Filed: Nov. 16, 2012

(65) Prior Publication Data

US 2013/0120351 A1     May 16, 2013

(30) Foreign Application Priority Data

Nov. 16, 2011  (KR) .................. 10-2011-0119542

(51) Int. Cl.
| | |
|---|---|
| G09G 3/00 | (2006.01) |
| G06F 3/038 | (2013.01) |
| H04N 13/04 | (2006.01) |
| G02B 27/22 | (2006.01) |
| G02B 27/26 | (2006.01) |
| G09G 3/36 | (2006.01) |
| G02F 1/29 | (2006.01) |

(52) U.S. Cl.
CPC ............ *G06F 3/038* (2013.01); *H04N 13/0454* (2013.01); *G02B 27/2214* (2013.01); *G02B 27/26* (2013.01); *G09G 3/003* (2013.01); *G09G 3/3611* (2013.01); *H04N 13/0413* (2013.01); *G02F 1/29* (2013.01)
USPC .......................................................... 345/32

(58) Field of Classification Search
CPC ... G06F 1/1607; G06F 1/1609; G09G 3/3406; G09G 3/3433; G09G 3/342
USPC ................ 345/1.1–9, 32; 349/15; 348/42–48; 353/7
See application file for complete search history.

(56) References Cited

U.S. PATENT DOCUMENTS

| | | | |
|---|---|---|---|
| 8,139,104 B2* | 3/2012 | Vos et al. ........................ 348/51 |
| 2006/0221048 A1* | 10/2006 | Nagasawa ..................... 345/104 |

FOREIGN PATENT DOCUMENTS

| | | |
|---|---|---|
| JP | 2000206572 A | 7/2000 |
| KR | 20080014405 A | 2/2008 |

OTHER PUBLICATIONS

Office Action issued in corresponding Korean Patent Application No. 10-2011-0119542, mailed Mar. 28, 2014, 4 pages.

* cited by examiner

*Primary Examiner* — Ram Mistry
(74) *Attorney, Agent, or Firm* — Brinks Gilson & Lione

(57) ABSTRACT

3D filter driving voltages can be stably supplied to the 3D filter via flexible printed circuit for distributing first to third voltages of the 3D filter driving voltage, even if electrodes of the 3D filter are shorted, by supplying the 3D filter driving voltages to the 3D filter in a distributed fashion.

4 Claims, 4 Drawing Sheets

STEREOSCOPIC IMAGE DISPLAY INCLUDING 3D FILTER WITH IMPROVED VOLTAGE DRIVING

This application claims the benefit of Korean Patent Application NO. 10-2011-0119542 filed on Nov. 16, 2012, which is incorporated herein by reference for all purposes as if fully set forth herein.

BACKGROUND

1. Field

This document relates to a stereoscopic image display comprising a 3D filter.

2. Related Art

A stereoscopic image display device displays a stereoscopic image, i.e., a three-dimensional (3D) image using a stereoscopic technique or an autostereoscopic technique. The stereoscopic technique, which uses a parallax image of left and right eyes of a user with a high stereoscopic effect, includes a glasses method and a non-glasses method, which have been put to practical use. In the glasses method, left and right parallax images each having a different polarization direction are displayed on a direct-view display or projector, and a stereoscopic image is displayed using polarization glasses or liquid crystal shutter glasses. In the non-glasses method, optical parts, such as a parallax barrier and a lenticular lens, are installed in front of a display screen to separate optical axes of left and right parallax images.

The glasses-type stereoscopic image display is divided into a stereoscopic image display using polarization glasses and a stereoscopic image display using shutter glasses. In the stereoscopic image display using polarization glasses, a polarization separation element, such as a pattern retarder, is required to be attached on the display panel. The pattern retarder renders the polarization of the left and right-eyed images displayed on the display panel to be different from each other. When watching a stereoscopic image displayed on the stereoscopic image display using polarization glasses, a viewer sees polarized light of the left-eyed image through a left-eyed filter of the polarization glasses and polarized light of the right-eyed image through a right-eyed filter of the polarization glasses, thereby perceiving a 3D effect.

The parallax barrier, the lenticular lens, and the patterned retarder are implemented as a 3D filter, which has a liquid crystal layer formed between two transparent substrates and electrodes formed on the substrates. Thus, the driving state of the 3D filter can be electrically controlled. Such a 3D filter is adhered to the display panel, and can switch between 2D image and 3D image by changing or refracting the traveling path of light incident from the display panel by using dielectric anisotropy and refractive index anisotropy of liquid crystal molecules.

The 3D filter comprises electrodes for applying an electric filed to the liquid crystal layer. When overcurrent is applied to an electrode pattern during the inspection or driving of the 3D filter, edge portions of the electrode pattern may be burnt or shorted. In this case, the 3D filter cannot be properly driven.

SUMMARY

A stereoscopic image display comprises: a display panel that displays a 2D image in 2D mode and displays a 3D image in 3D mode; a 3D filter adhered to the display panel; a source printed circuit board connected to the display panel; and a flexible printed circuit connected between the source printed circuit board and the 3D filter.

The source printed circuit board comprises a module power supply that generates analog driving voltages of the display panel and a 3D filter driving voltage.

The flexible printed circuit comprises: a first wiring group for distributing a first voltage of the 3D filter driving voltage; a second wiring group for distributing a second voltage of the 3D filter driving voltage; and a third wiring group for distributing a third voltage of the 3D filter driving voltage.

The 3D filter comprises: a common electrode to be supplied with the first voltage; and a plurality of divided electrodes to be supplied with either one of the second voltage and the third voltage.

DETAILED DESCRIPTION OF THE EXEMPLARY EMBODIMENTS

Figure 1:
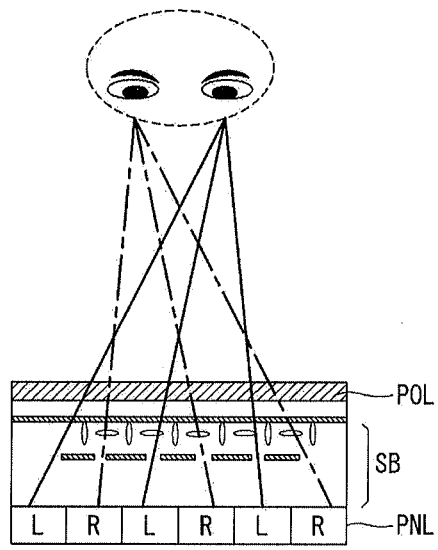
FIG. 1 is a view schematically showing a switchable barrier.

Hereinafter, exemplary embodiments of the present invention will be described with reference to the drawings. Throughout the specification, like reference numerals denote substantially like components. In the following description, if it is decided that the detailed description of known function or configuration related to the invention makes the subject matter of the invention unclear, the detailed description is omitted.

Before describing the embodiments of this invention, the terms used herein will be defined.

As stated above, a 3D filter refers to an optical part which is adhered to a display panel of a display device and electrically controlled and switches between light of a 2D image and light of a 3D image. The 3D filter comprises an upper transparent substrate, a lower transparent substrate, electrodes formed on the transparent substrates, and a liquid crystal layer formed between the transparent substrates. The 3D filter of the present invention is implemented as one of a switchable barrier, a switchable lens, and an active retarder.

3D filter driving voltages are applied to the electrodes formed in the 3D filter to drive liquid crystal molecules. The 3d filter driving voltages comprise at least two voltages.

A display device displays a 2D image or 3D image. The display device is implemented as a flat panel display such as a liquid crystal display (LCD), a field emission display (FED), a plasma display panel (PDP), an organic light emitting diode (OLED), and an electrophoresis EPD.

FIGS. 1 through 5 are views schematically showing structures of a switchable barrier, a switchable lenticular lens, and an active retarder according to an exemplary embodiment of the present invention.

Figure 8:
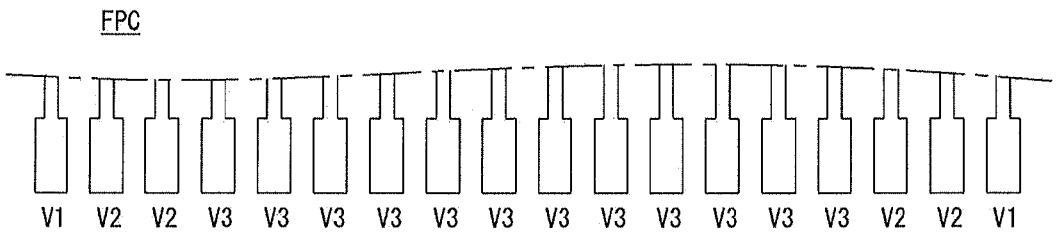
FIG. 8 is a view showing a voltage applied to the wiring lines of the flexible printed circuit FPC.

Referring to FIG. 1, a switchable barrier SB is formed between a display panel PNL and a polarizer POL. The switchable barrier comprises an upper transparent substrate, a lower transparent substrate, and a liquid crystal layer formed between the substrates. A common electrode is formed on either one of the upper and lower transparent substrates, and a plurality of divided electrodes are formed on the other transparent substrate. The common electrode and the divided electrodes are formed of a transparent conductive material, for example, ITO (indium tin oxide), so as to transmit light through them. A common voltage, for example, 'V1' of FIG. 8, is applied to the common electrode. Voltages of different potentials, for example, V2 and V3 voltages of FIG. 8, are applied to the divided electrodes. In the 2D mode and 3D mode, a different voltage is applied to the divided electrodes. While the V2 voltage is a voltage close to the common voltage V1, the V3 voltage is a voltage having a potential difference of a predetermined value or more with the common voltage V1. A 2D filter driving voltage including the V1, V2, and V3 voltages is applied to the switchable barrier SB.

In 3D mode, the V2 voltage is applied to divided electrodes included in a white gray scale display portion. Liquid crystal molecules of the white gray scale display portion rise due to a voltage difference between the V1 voltage and the V2 voltage. In the white gray scale display portion, the traveling direction of light is parallel to the long-axis direction in which the refractive index of the liquid crystal molecules is high, and therefore the phase of the light is delayed by 180°. Thus, the light having passed through the liquid crystal layer passes through the polarizer POL. On the other hand, the V3 voltage is applied to divided electrodes included in a black gray scale display portion. Liquid crystal molecules of the black gray scale display portion are rotated due to a large voltage difference between the V1 voltage and the V3 voltage. In the black gray scale display portion, the traveling direction of light is parallel to the short-axis direction in which the refractive index of the liquid crystal molecules is low, and therefore the value of phase delay of the light is little. Thus, the light cannot pass through the polarizer POL. Accordingly, the switchable barrier SB separates the traveling paths of light of a left-eye image and light of a right-eye image so as to allow the light of the left-eye image to enter the left-eye of a viewer and the light of the right-eye image to enter the right-eye of the viewer in the 3D mode. To implement a moving barrier by moving the white gray scale display portion and the black gray scale display portion, the switchable barrier SB can switch between the V2 voltage and the V3 voltage, which are supplied to the divided electrodes of the switchable barrier SB.

In 2D mode, the V2 voltage is applied to all the divided electrodes, and therefore the light of the 2D image displayed on the pixels of the display panel PNL passes through the polarizer POL. Accordingly, the switchable barrier SB displays the 2D image in the 2D mode.

Figure 2:
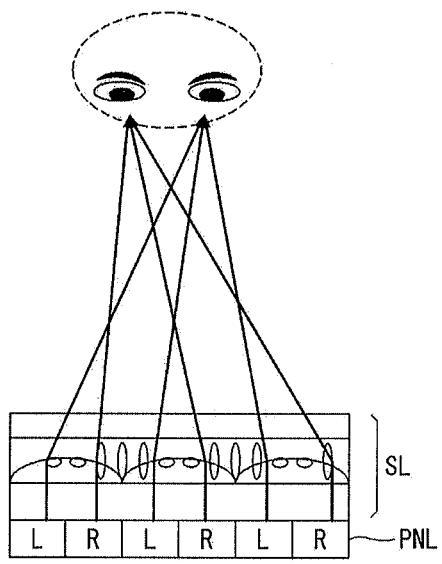
FIG. 2 is a view schematically showing a switchable lens.
Figure 3:
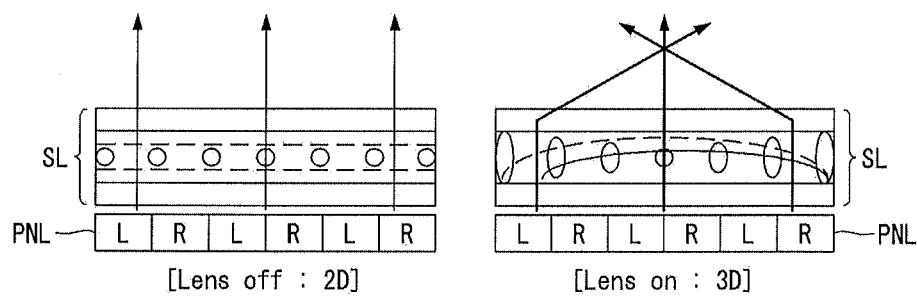
FIG. 3 is a view showing the comparison of the traveling path of light passing through the switchable lens between the 2D mode and the 3D mode.

Referring to FIGS. 2 and 3, a switchable lens SL comprises an upper transparent substrate, a lower transparent substrate, and a liquid crystal layer formed between the substrates. A common electrode is formed on either one of the upper and lower transparent substrates, and a plurality of divided electrodes are formed on the other transparent substrate. The common electrode and the divided electrodes are formed of a transparent conductive material, for example, ITO, so as to transmit light through them. A common voltage, for example, 'V1' of FIG. 8, is applied to the common electrode. The V2 voltage, the V3 voltage, and voltages between the V2 voltage and the V3 voltage whose difference gradually increases or decreases are applied to the divided electrodes. Different voltages are applied to the divided electrodes in the 2D mode and the 3D mode. The V1 voltage, the V2 voltage, and the V3 voltage are applied to the switchable lens LS, and intermediate gray scale voltages between the V2 voltage and the V3 voltage can be generated by a voltage-dividing circuit within the switchable lens LS.

In the 3D mode, voltages having a voltage difference are applied to neighboring divided electrodes so that liquid crystal molecules of the liquid crystal layer positioned at both ends rise and the liquid crystal molecules are gradually inclined toward the center of the lens, within 1 lens pitch. Accordingly, in the 3D mode, the refractive index distribution of the liquid crystal molecules of the switchable lens SL is similar to that of the lenticular lens and the optical functionality thereof is also similar to that of the lenticular lens, whereby the switchable lens SL can function as the lenticular lens. As a result, in the 3D mode, the switchable lens SL separates light of a left-eye image L and light of a right-eye image R displayed on the display panel PNL and displays a 3D image.

In the 2D mode, the V2 voltage is applied to all the divided electrodes of the switchable lens SL, and therefore light of a 2D image displayed on the pixels of the display panel PNL can pass through the switchable lens SL. Accordingly, in the 2D mode, the switchable lens SL displays the 2D image.

Figure 4:
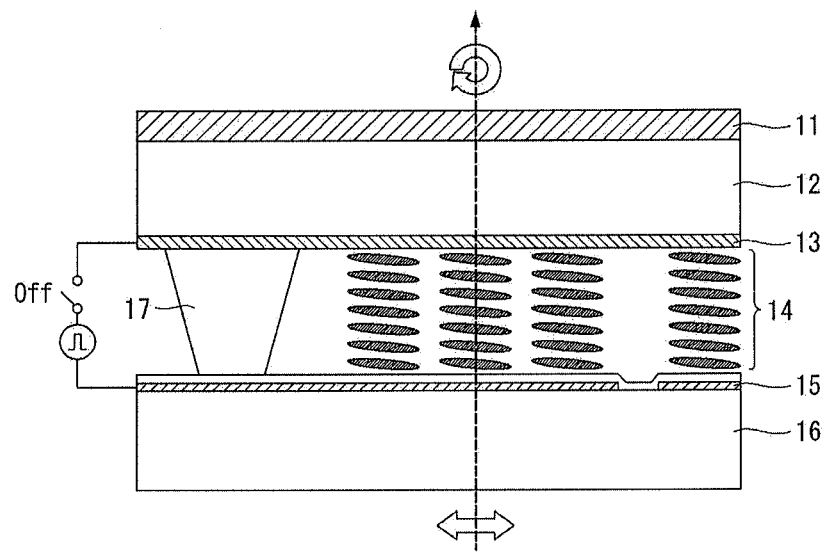
FIGS. 4 and 5 are views showing the polarization characteristics of light which change in accordance with the driving of a liquid crystal layer of an active retarder.
Figure 5:
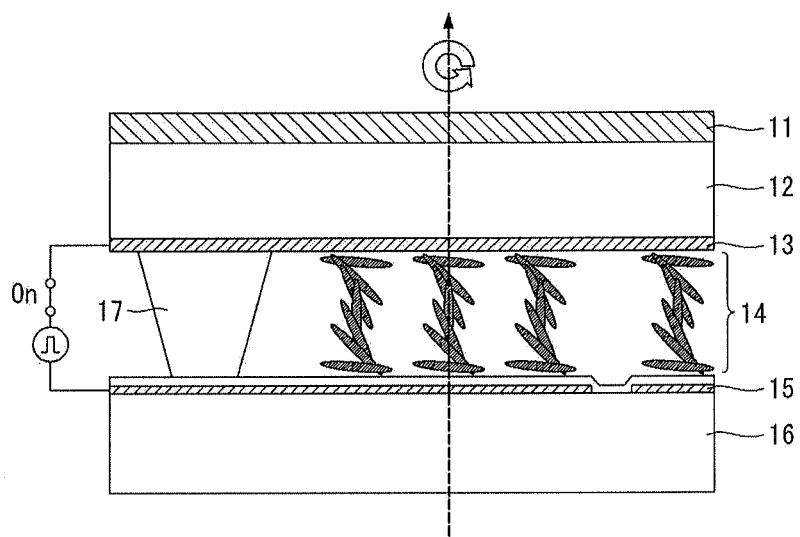

Referring to FIGS. 4 and 5, an active retarder comprises an upper transparent substrate 12, a lower transparent substrate 16, and a liquid crystal layer 14 formed between the substrates. A common electrode 13 is formed on either one of the upper and lower transparent substrates 12 and 16, and a plurality of divided electrodes 15 are formed on the other transparent substrate. A ¼ wavelength plate is adhered to the upper transparent substrate 12. In FIGS. 4 and 5, reference numeral 17 denotes a spacer for maintaining a cell gap of the liquid crystal layer 14.

In the 3D mode, the V2 voltage and the V3 voltage are alternately applied to the divided electrodes. As a result, the value of phase delay of light passing through the liquid crystal layer is periodically changed. The light which passes through the liquid crystal layer passes through the ¼ wavelength plate. Accordingly, in the 3D mode, the active retarder allows left circularly polarized light and right circularly polarized light to alternately pass therethrough, in synchronization with a left-eye image displayed on the display panel PNL during an Nth (N is a positive integer) and a right-eye image displayed on the display panel PNL during an (N+1)th frame period, respectively. A viewer wearing polarization glasses can perceive the left circularly polarized light and the right circularly polarized light, separately, in the 3D mode. Accordingly, in the 3D mode, the active retarder can separate the polarized light of the left-eye image and the polarized light of the right-eye image and display a 3D image.

In the 2D mode, the V2 voltage or the V3 voltage is applied to the divided electrodes. By taking off the polarization glasses in the 2D mode, the viewer can view the pixels displayed on the display panel PNL, without separating the left-eye image and the right-eye image. Accordingly, in the 2D mode, the active retarder can separate the polarized light of the left-eye image and the polarized light of the right-eye image and display a 3D image.

Figure 6:
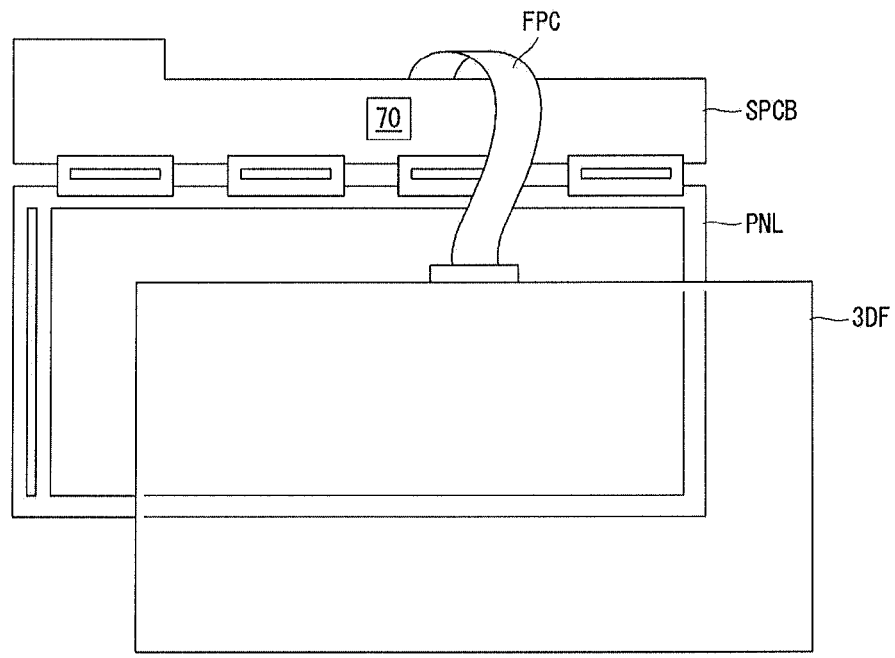
FIG. 6 is a view showing a stereoscopic image display according to an exemplary embodiment of the present invention.
Figure 7:
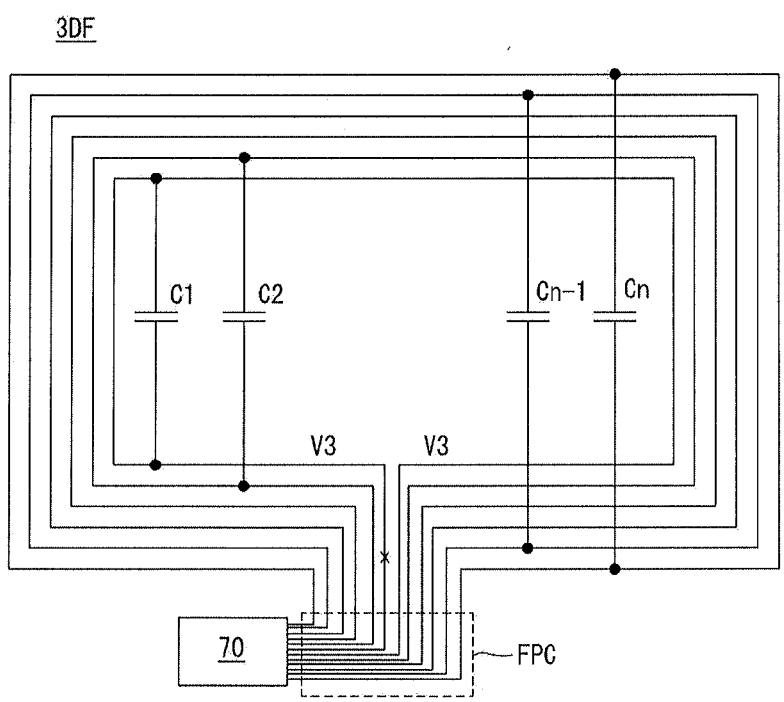
FIG. 7 is views showing a 3D filter and wiring lines of a flexible printed circuit FPC connected to the 3D filter according to an exemplary embodiment of the present invention.

FIGS. 6 and 7 are views showing a stereoscopic image display according to an exemplary embodiment of the present invention.

Referring to FIGS. 6 and 7, the stereoscopic image display of the present invention comprises a display panel PNL, a source printed circuit board (hereinafter, "source PCB") SPCB, a flexible printed circuit (hereinafter, "FPC" and a 3D filter 3DF.

The display panel PNL comprises a pixel array defined in a matrix form at crossings of data lines and scan lines (or gate lines). The pixel array displays a 2D image in the 2D mode and displays a 3D image in the 3D mode. Of the 3D image, a left-eye image and a right-eye image are temporally or spatially divided and displayed on the pixel array. A data voltage for the 2D/3D image is supplied to the data lines. Scan pulses (or gate pulses) synchronized with the data voltage are sequentially supplied to the scan lines sequentially select the pixels to be supplied with the data voltage line by line. As stated above, the display panel PNL can be implemented as a liquid crystal display LCD, an electric field emission display panel FED, a plasma display panel PDP, an organic light emitting diode display panel OLED, an electrophoretic display panel EPD, etc.

Source ICs (integrated circuits) integrated with a data driving circuit and scan ICs integrated with a scan driving circuit are mounted on the display panel PNL. The data driving circuit converts digital video data from a timing controller into a gamma compensation voltage and outputs a data voltage to be charged in the pixels. The data voltage is supplied to the data lines of the display panel PNL. The scan driving circuit sequentially supplies scan pulses to the scan lines of the display panel PNL under the control of the timing controller.

A source PCB (SPCB) is connected to the display panel PNL via the source ICs. A timing controller and a module power supply 70 are mounted on the source PCB (SPCB). The timing controller transmits digital video data input from an external host system to the source IC, and controls the operation timings of the source ICs and the scan ICs.

The module power supply 70 generates an analog driving voltage of the display panel PNL, for example, a gamma compensation voltage, a scan pulse voltage, and a high-potential driving voltage VDD, by using a DC-DC converter, a regulator, etc. Moreover, the module power supply 70 generates 3D filter driving voltages V1, V2, and V3. The V1, V2, and V3 voltages each are output in a distributed fashion through a plurality of output terminals from the module power supply 70.

An FPC is connected between the source PCB and the 3D filter 3DF to supply the 3D filter driving voltages V1, V2, and V3 from the module power supply 70 to the 3D filter 3DF.

In the present invention, the 3D filter driving voltages V1, V2, and V3 can be stably supplied to the 3D filter 3DF, even if electrodes of the FPC or 3D filter 3DF are burn or shorted due to overcurrent, by changing wiring lines of the FPC and power input terminals of the 3D filter 3DF. To this end, the FPC comprises first to third wiring groups, as shown in FIG. 8. The first wiring group comprises a plurality of wiring lines to which the V1 voltage is supplied in a distributed fashion. The second wiring group comprises a plurality of wiring lines to which the V2 voltage is supplied in a distributed fashion, and the third wiring group comprises a plurality of wiring lines to which the V3 voltage is supplied in a distributed fashion.

The power input terminals of the 3D filter 3DF comprise a plurality of power input terminals connected one to one to the wiring lines of the wiring groups. The power input terminals of the 3D filter 3DF comprise a plurality of first power input terminals to which the V1 voltage is supplied through the first wiring group of the FPC, a plurality of second power input terminals to which the V2 voltage is supplied through the second wiring group of the FPC, and a plurality of third power input terminals to which the V3 voltage is supplied through the second wiring group of the FPC. In FIG. 7, "C1~Cn" denotes the parasitic capacitance present in the divided electrodes connected to the power input terminals of the 3D filter.

A common electrode of the 3D filter 3DF is connected to the plurality of first power input terminals to which the V1 voltage is supplied. Each of the divided electrodes of the 3D filter 3DF is connected to the plurality of second power input terminals or the plurality of third power input terminals. At least part of the divided electrodes can be commonly connected to the plurality of second power input terminals and the plurality of third power input terminals.

In FIG. 8, if any one of the divided electrodes of the 3D filter 3DF to which the V3 voltage is supplied is shorted as indicated by "x", the shorted divided electrodes can be supplied with the V3 voltage through a different first power input terminal. Accordingly, the present invention can improve the reliability of the stereoscopic image display because the 3D filter can be properly driven without repairing or replacing the electrodes of the 3D filter even if the electrodes are shorted. Further, the present invention can prevent the voltage of the electrodes of the 3D filter from varying with position due to a voltage drop since the same driving voltage is applied to the electrodes at different positions.

Throughout the description, it should be understood for those skilled in the art that various changes and modifications are possible without departing from the technical principles of the present invention. Therefore, the technical scope of the present invention is not limited to those detailed descriptions in this document but should be defined by the scope of the appended claims.

What is claimed is:

1. A stereoscopic image display comprising:
   a display panel that displays a 2D image in 2D mode and displays a 3D image in 3D mode;
   a 3D filter adhered to the display panel and comprising a common electrode, a plurality of divided electrodes, and a liquid crystal layer disposed between the common electrode and the plurality of divided electrodes, wherein the liquid crystal layer is driven by 3D filter driving voltages applied to the common electrode and the plurality of divided electrodes;
   a source printed circuit board connected to the display panel; and
   a flexible printed circuit connected between the source printed circuit board and the 3D filter,
   wherein the source printed circuit board comprises a module power supply that generates analog driving voltages of the display panel and the 3D filter driving voltages, and the flexible printed circuit comprises:
   a first wiring group for distributing a first voltage of the 3D filter driving voltages to the common electrode;
   a second wiring group for distributing a second voltage of the 3D filter driving voltages to the divided electrodes; and
   a third wiring group for distributing a third voltage of the 3D filter driving voltages to the divided electrodes.

2. The stereoscopic image display of claim 1, wherein power input terminals of the 3D filter comprise:
   a plurality of first power input terminals to which the first voltage is supplied through the first wiring group;
   a plurality of second power input terminals to which the second voltage is supplied through the second wiring group; and
   a plurality of third power input terminals to which the third voltage is supplied through the third wiring group, and each of the divided electrodes of the 3D filter is connected to the plurality of second power input terminals or the plurality of third power input terminals.

3. The stereoscopic image display of claim 1, wherein the 3D filter comprises any one of the following: a switchable barrier, a switchable lens, and an active retarder.

4. The stereoscopic image display of claim 2, wherein the module power supply outputs the first voltage in a distributed fashion through a plurality of output terminals and supplies the same to wiring lines of the first wiring group, outputs the second voltage in a distributed fashion through the plurality of output terminals and supplies the same to wiring lines of the second wiring group, and outputs the third voltage in a distributed fashion through the plurality of output terminals and supplies the same to wiring lines of the third wiring group.

* * * * *